(12) United States Patent
Fujioka et al.

(10) Patent No.: US 8,985,755 B2
(45) Date of Patent: Mar. 24, 2015

(54) INK, INK CARTRIDGE, AND INK JET RECORDING METHOD

(71) Applicant: Canon Kabushiki Kaisha, Tokyo (JP)

(72) Inventors: Fumiaki Fujioka, Kawasaki (JP); Masashi Ogasawara, Machida (JP); Keigo Gouda, Kawasaki (JP); Souichi Nagai, Kawasaki (JP); Akiko Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/294,416

(22) Filed: Jun. 3, 2014

(65) Prior Publication Data

US 2015/0002576 A1    Jan. 1, 2015

(30) Foreign Application Priority Data

Jun. 26, 2013 (JP) ................. 2013-133468

(51) Int. Cl.
 *B41J 2/25* (2006.01)
 *C09D 11/322* (2014.01)

(52) U.S. Cl.
 CPC .................... *C09D 11/322* (2013.01)
 USPC ........................................ 347/100

(58) Field of Classification Search
 None
 See application file for complete search history.

(56) References Cited

U.S. PATENT DOCUMENTS

| | | | |
|---|---|---|---|
| 5,835,116 A | 11/1998 | Sato et al. | |
| 6,027,210 A | 2/2000 | Kurabayashi et al. | |
| 6,238,045 B1 | 5/2001 | Ono et al. | |
| 6,398,355 B1 | 6/2002 | Shirota et al. | |
| 6,412,936 B1 | 7/2002 | Mafune et al. | |
| 6,733,120 B2 | 5/2004 | Ogasawara et al. | |
| 7,005,461 B2 | 2/2006 | Sanada et al. | |
| 7,160,376 B2 | 1/2007 | Watanabe et al. | |
| 7,267,717 B2 | 9/2007 | Watanabe et al. | |
| 7,276,112 B2 | 10/2007 | Tokuda et al. | |
| 7,297,203 B2 | 11/2007 | Takada et al. | |
| 7,371,274 B2 | 5/2008 | Sanada et al. | |
| 7,377,631 B2 | 5/2008 | Takada et al. | |
| 7,601,210 B2 | 10/2009 | Fujioka et al. | |
| 7,605,192 B2 | 10/2009 | Sanada et al. | |
| 7,690,780 B2 * | 4/2010 | Kato | 347/100 |
| 7,705,071 B2 | 4/2010 | Nakagawa et al. | |
| 7,753,515 B2 | 7/2010 | Tokuda et al. | |
| 7,806,970 B2 | 10/2010 | Fujioka et al. | |
| 7,819,962 B2 | 10/2010 | Gu | |
| 7,829,607 B2 * | 11/2010 | Ushiku | 523/160 |
| 7,883,199 B2 | 2/2011 | Hakamada et al. | |
| 7,909,448 B2 | 3/2011 | Iwata et al. | |
| 8,007,097 B2 | 8/2011 | Sanada et al. | |
| 8,469,504 B2 | 6/2013 | Saito et al. | |
| 8,475,580 B2 | 7/2013 | Nagai et al. | |
| 8,491,715 B2 | 7/2013 | Gouda et al. | |
| 8,613,509 B2 * | 12/2013 | Nagase et al. | 347/100 |
| 8,672,465 B2 | 3/2014 | Sanada et al. | |
| 2007/0100024 A1 | 5/2007 | Gu et al. | |
| 2009/0258145 A1 | 10/2009 | Mukae et al. | |
| 2013/0271540 A1 | 10/2013 | Saito et al. | |
| 2014/0043407 A1 | 2/2014 | Kudo et al. | |
| 2014/0063114 A1 | 3/2014 | Sanada et al. | |

FOREIGN PATENT DOCUMENTS

| | | |
|---|---|---|
| JP | 2007-217695 A | 8/2007 |
| JP | 2009-515007 A | 4/2009 |
| JP | 2011-515535 A | 5/2011 |

* cited by examiner

*Primary Examiner* — Lamson Nguyen
(74) *Attorney, Agent, or Firm* — Fitzpatrick, Cella, Harper & Scinto

(57) ABSTRACT

Provided is an ink for ink jet including a first pigment and a second pigment. Each of the first pigment and the second pigment comprises a self-dispersible carbon black in which a functional group containing two phosphonic acid groups is bonded to a particle surface. The average particle size of the first pigment is smaller than the average particle size of the second pigment. The introduced amount of the functional group of the first pigment is higher than the introduced amount of the functional group of the second pigment.

6 Claims, No Drawings

INK, INK CARTRIDGE, AND INK JET RECORDING METHOD

BACKGROUND OF THE INVENTION

1. Field of the Invention

The present invention relates to an ink, an ink cartridge, and an ink jet recording method.

2. Description of the Related Art

An ink to be used in an ink jet recording method has been required to additionally increase the optical density of an image to be recorded in recent years. Of the recording media on which images are to be recorded, various kinds of plain paper different from each other in ink permeability are available, and the difference affects image characteristics. In particular, the optical density of an image to be recorded on a recording medium having high ink permeability is liable to reduce.

To meet the above-mentioned requirement, there has been made a proposal concerning an increase in optical density of an image with an ink containing a self-dispersible pigment in which a functional group having high reactivity with calcium is bonded to the surface of a pigment particle (see Japanese Patent Application Laid-Open No. 2009-515007). Japanese Patent Application Laid-Open No. 2009-515007 describes a self-dispersible pigment having a phosphonic acid group. When an ink containing this self-dispersible pigment is stored, a phosphonic acid group may be detached to reduce the storage stability of the ink depending on the structure of a functional group of the self-dispersible pigment. To cope with such problem, there has been made a proposal concerning the use of a self-dispersible pigment having a structure capable of suppressing the detachment of a phosphonic acid group (see Japanese Patent Application Laid-Open No. 2011-515535).

In addition, there has been made a proposal concerning improvements in optical density, uniformity, scratch resistance, and the like of an image to be recorded with an ink containing two kinds of pigments different from each other in peak shape in a particle size distribution (see Japanese Patent Application Laid-Open No. 2007-217695).

SUMMARY OF THE INVENTION

An investigation conducted by the inventors of the present invention has revealed that image quality such as the optical density or uniformity of an image to be recorded, image durability such as its scratch resistance, and the storage stability of an ink cannot be satisfied at high levels even by employing any such related-art technology as described above. First, the optical density of the image is increased to some extent with the self-dispersible pigment described in Japanese Patent Application Laid-Open No. 2009-515007, but a phosphonic acid group detaches and hence the storage stability of the ink has been insufficient. The investigation has also revealed that the detachment of a phosphonic acid group is suppressed to some extent with the self-dispersible pigment described in Japanese Patent Application Laid-Open No. 2011-515535, but the storage stability of the ink may still be insufficient owing to the detachment of a phosphonic acid group depending on the average particle size of the pigment, and on the introduced amount of a functional group. On the other hand, the optical density, uniformity, and scratch resistance of the image to be recorded are improved to some extent with the ink described in Japanese Patent Application Laid-Open No. 2007-217695. However, the optical density is about 1.3, which has still been insufficient. The investigation has also revealed that the scratch resistance merely depends on the properties of a resin added to the ink. In other words, in each of the related-art technologies, the characteristics are merely somewhat improved from levels that have been general at that time, and none of the characteristics has satisfied a level required in recent years.

Therefore, an object of the present invention is to provide an ink that is capable of providing an image excellent in image quality such as an optical density and uniformity, and in image durability such as scratch resistance, and that is excellent in storage stability. Another object of the present invention is to provide an ink cartridge and ink jet recording method using the ink.

The objects are achieved by the present invention as described below. That is, an ink according to the present invention is an ink for ink jet, including: a first pigment; and a second pigment, in which: each of the first pigment and the second pigment includes a self-dispersible carbon black in which a functional group containing two phosphonic acid groups is bonded to a particle surface; an average particle size of the first pigment is smaller than an average particle size of the second pigment; and an introduced amount of the functional group of the first pigment is higher than an introduced amount of the functional group of the second pigment.

According to the present invention, the ink that is capable of providing an image excellent in image quality such as an optical density and uniformity, and in image durability such as scratch resistance, and that is excellent in storage stability can be provided. In addition, according to the present invention, the ink cartridge and ink jet recording method using the ink are provided.

Further features of the present invention will become apparent from the following description of exemplary embodiments.

DESCRIPTION OF THE EMBODIMENTS

Hereinafter, the present invention is described in detail by way of preferred embodiments of the present invention. It should be noted that in the following description, an ink for ink jet is sometimes simply abbreviated as "ink." In addition, two phosphonic acid groups are sometimes referred to as "bisphosphonic acid group," and a pigment having two phosphonic acid groups is sometimes referred to as "bisphosphonic acid type self-dispersible pigment." In the present invention, various physical property values are values at 25° C. unless otherwise stated.

The inventors of the present invention have first conducted various investigations with an ink containing a carbon black in which a functional group containing a bisphosphonic acid group is bonded to a particle surface described in Japanese Patent Application Laid-Open No. 2009-515007 and Japanese Patent Application Laid-Open No. 2011-515535 (hereinafter sometimes referred to as "bisphosphonic acid type carbon black"). As a result, the inventors have found that an image excellent in optical density is obtained and the optical density tends to increase as the average particle size of the carbon black is increased. The inventors have also found that the optical density additionally increases as the introduced amount of a functional group is reduced. However, the inventors have found that as the average particle size is increased, the storage stability of the ink tends to reduce, and as the introduced amount of the functional group is reduced, the storage stability similarly tends to reduce. A possible reason for the foregoing is that, as described above, in the case of a specific functional group having a bisphosphonic acid group in its structure, the bisphosphonic acid group is detached during the storage and hence the dispersed state of the carbon black is liable to destabilize. In actuality, in the first place, the dispersed state of a carbon black having a large average particle size or a low introduced amount of a functional group is liable to be unstable and hence the storage stability of the ink tends to reduce.

On the other hand, in the case of the related-art self-dispersible pigment in which a functional group having a carboxylic acid group in its structure is bonded to a particle surface, the storage stability, of course, improves as the introduced amount of the functional group increases. In addition, the optical density tends to increase depending on, for example, a water-soluble organic solvent to be used in combination. In other words, in the related-art self-dispersible pigment, it has been relatively easy to achieve both of the optical density of the image to be recorded and the storage stability of the ink by determining, for example, the water-soluble organic solvent to be used in combination.

In view of the foregoing, the inventors of the present invention have conducted an investigation on a water-soluble organic solvent that enables the achievement of both of the optical density and the storage stability even in the bisphosphonic acid type carbon black based on the findings in the related art on the self-dispersible pigment in which a functional group having a carboxylic acid group is bonded to a particle surface. However, the inventors have obtained the following result: it is difficult to achieve both of the optical density and the storage stability even by employing the same approach as the related art. The inventors have assumed the reason for the foregoing to be as follows: a self-dispersible pigment in which a functional group having a bisphosphonic acid group is bonded to a particle surface hardly interacts with a water-soluble organic solvent which is effective for the self-dispersible pigment in which a functional group having a carboxylic acid group is bonded to a particle surface.

Next, the inventors of the present invention have paid attention to the average particle size and introduced amount of a functional group of the bisphosphonic acid type carbon black again, and have conducted a further investigation on an ink containing two kinds of self-dispersible pigments different from each other in average particle size and introduced amount of a functional group. Specifically, the inventors have conducted an investigation on an ink using a self-dispersible carbon black having a relatively large average particle size and a relatively low introduced amount of a functional group, and a self-dispersible carbon black having a relatively small average particle size and a relatively high introduced amount of a functional group in combination. As a result, the inventors have found that the optical density and uniformity of the image to be recorded as well as the storage stability of the ink can be achieved at the same time at a high level by adopting the foregoing construction irrespective of the structure of a functional group containing a phosphonic acid group. The inventors have also found that the scratch resistance of the image to be recorded also improves.

Meanwhile, the inventors have conducted an investigation on the case of an ink containing two kinds of self-dispersible carbon blacks having the same average particle size but different from each other in introduced amount of a functional group. As a result, the inventors have found that the proportion of detachment of a bisphosphonic acid group from a functional group bonded to the surface of a particle of a self-dispersible carbon black having a high introduced amount of a functional group becomes large as compared with that of a self-dispersible carbon black having a low introduced amount of a functional group. In addition, the inventors have found that the detachment of a bisphosphonic acid group from a functional group bonded to the surface of a particle of the self-dispersible carbon black having a low introduced amount of the functional group is suppressed to some extent by the detached bisphosphonic acid group. However, when the average particle size is increased for an increase in optical density of the image to be recorded, the detachment-suppressing effect tends to be hardly exhibited and hence the storage stability of the ink hardly improves to a large extent. On the other hand, when the average particle size is reduced for an improvement in storage stability of the ink, the storage stability improves, but the self-dispersible pigment having a high introduced amount of the functional group is incorporated and hence the optical density hardly increases to a large extent. In addition, the scratch resistance of the image to be recorded also hardly improves.

In addition, the inventors have conducted an investigation on the case of an ink containing two kinds of self-dispersible carbon blacks having the same introduced amount of a functional group but different from each other in average particle size. As a result, the inventors have found that the amounts of bisphosphonic acid groups detached from respective functional groups bonded to the two kinds of self-dispersible carbon blacks become similar to each other, and a detachment-suppressing effect reduces. When the self-dispersible carbon black having a low introduced amount of the functional group is used in combination for an increase in optical density of the image to be recorded as in the foregoing in view of the findings, the storage stability of the ink tends to reduce additionally. On the other hand, when the self-dispersible carbon black having a high introduced amount of the functional group is used in combination for an improvement in storage stability, the optical density hardly increases to a large extent again. In addition, the scratch resistance of the image to be recorded also hardly improves.

Further, the inventors have conducted an investigation on the case of an ink containing two kinds of carbon blacks, i.e., a self-dispersible carbon black having a relatively small average particle size and a relatively low introduced amount of a functional group, and a self-dispersible carbon black having a relatively large average particle size and a relatively high introduced amount of a functional group. As a result, the inventors have found that the proportion of detachment of a bisphosphonic acid group from a functional group bonded to the surface of a particle of the self-dispersible carbon black having a relatively large average particle size and a relatively high introduced amount of the functional group becomes large. In addition, the inventors have found that the detachment of a bisphosphonic acid group from a functional group bonded to the surface of a particle of the self-dispersible carbon black having a low introduced amount of the functional group is suppressed to some extent by the detached bisphosphonic acid group. However, the inventors have found that the optical density of the image to be recorded hardly increases and its scratch resistance also hardly improves.

In contrast, in the present invention, a first pigment having a relatively small average particle size and a relatively high introduced amount of a functional group, and a second pigment having a relatively large average particle size and a relatively low introduced amount of a functional group were used in combination. As a result, the inventors have found that high storage stability of an ink based on a suppressing effect on the detachment of a bisphosphonic acid group from a functional group bonded to the surface of a particle of the second pigment is provided by the first pigment. The inventors have also found that a high optical density and high uniformity of an image to be recorded with the second pigment are exhibited, and hence both of the image quality and the storage stability of the ink can be achieved. That is, the main feature of the present invention is to use the first pigment having a relatively small average particle size and a relatively high introduced amount of the functional group, and the second pigment having a relatively large average particle size and a relatively low introduced amount of the functional group in combination. The inventors have also found that the scratch resistance of the image to be recorded can be improved by adopting the foregoing construction. This is probably because the respective pigments are significantly different from each other in agglomeration rate in a recording medium. That is, the following assumption is made. The particles of the second pigment agglomerate first in the recording medium, and then the particles of the first pigment are densely filled into gaps between the agglomerated particles of the second pigment to agglomerate. Thus, a pigment layer constituting the image becomes dense to improve the scratch resistance of the image to be recorded. The inventors have also assumed that because the second pigment facilitates the filling of a gap between the pigment layer and the recording medium, the scratch resistance is improved.

Ink

Hereinafter, each component constituting an ink of the present invention and the physical properties of the ink are described in detail.

Pigment

The ink of the present invention contains a first pigment and a second pigment. In addition, each of the first pigment and the second pigment is a self-dispersible carbon black in which a functional group containing two phosphonic acid groups is bonded to a particle surface. The use of such self-dispersible carbon black eliminates the need for the addition of a dispersant such as a resin or surfactant for dispersing the pigments in the ink, or can reduce the addition amount of the dispersant. It should be noted that another pigment, dye, or the like can be further used in combination for the toning of the ink or the like.

Each of the contents (mass %) of the first pigment and second pigment in the ink is preferably 0.10 mass % or more and 10.00 mass % or less with reference to the total mass of the ink. In addition, the total content (mass %) of the first pigment and second pigment in the ink is preferably 0.10 mass % or more and 15.00 mass % or less, more preferably 1.00 mass % or more and 10.00 mass % or less with reference to the total mass of the ink. In addition, the mass ratio of the content (mass %) of the first pigment to the content (mass %) of the second pigment is preferably 0.05 times or more and 0.45 times or less. It should be noted that each of the contents of the first pigment and the second pigment in this case is a value with reference to the total mass of the ink. When the mass ratio falls within the range, image quality and image durability, and the storage stability of the ink can be satisfied at particularly high levels. In addition, the mass ratio of the content (mass %) of the first pigment to the content (mass %) of the second pigment is more preferably 0.05 times or more and 0.15 times or less. When the mass ratio falls within the range, the image quality and the image durability can be improved to particularly excellent levels while the storage stability of the ink is satisfied at a high level.

Each of the first pigment and the second pigment needs to be such that a functional group containing two phosphonic acid groups is bonded to a particle surface. Suppose, for example, that an ink containing a "monophosphonic acid type self-dispersible pigment" in which a functional group containing one phosphonic acid group is bonded to a particle surface is used. The use of such ink can improve the optical density of an image to be recorded to some extent as compared with the case where an ink containing a self-dispersible pigment in which a functional group containing a carboxylic acid group is bonded to a particle surface is used. However, the extent to which the optical density is improved is insufficient. In addition, when an ink containing a "trisphosphonic acid type self-dispersible pigment" in which a functional group containing three phosphonic acid groups is bonded to a particle surface is used, the storage stability of the ink is insufficient. In contrast, an image having a high optical density irrespective of the kind of recording medium can be recorded by using an ink containing "bisphosphonic acid type self-dispersible pigment" in which a functional group containing two phosphonic acid groups is bonded to a particle surface. In addition, the ink containing such "bisphosphonic acid type self-dispersible pigment" is relatively excellent in storage stability.

The two phosphonic acid groups in the functional group are each specifically represented by the general formula "—PO(O[$M_1$])$_2$." Here, $M_1$'s in the general formula each independently represent at least one kind selected from the group consisting of a hydrogen atom, an alkali metal, ammonium, and an organic ammonium. It should be noted that the phosphonic acid group may be in a state where some of the group dissociate, or may be in a state where all of the group dissociate. That is, the phosphonic acid group can take any one of the following forms: —$PO_3H_2$ (acid form), —$PO_3H^-M_1^+$ (monobasic salt), and —$PO_3^{2-}(M_1^+)_2$ (dibasic salt). The counter ion represented by $M_1^+$ is preferably at least one kind selected from $Na^+$, $K^+$, and $NH_4^+$ from the viewpoint that the dissociated state of the phosphonic acid group in the ink is kept in an additionally good state.

In addition, the phosphonic acid group is preferably present at a terminal of the functional group. That is, any other atomic group is preferably present between the surface of a carbon black particle and the phosphonic acid group. Specific examples of the other atomic group (—R—) can include a linear or branched alkylene group having 1 to 12 carbon atoms, an arylene group such as a phenylene group or a naphthylene group, an amide group, a sulfonic acid group, an amino group, a carbonyl group, an ester group, and an ether group. A group obtained by combining two or more of those groups is also usable. Further, the other atomic group preferably contains at least one of an alkylene group and an arylene group as well as a group having hydrogen-bonding property (an amide group, a sulfonic acid group, an imino group, an amino group, a carbonyl group, an ester group, or an ether group). The functional group particularly preferably contains —$C_6H_4$—CONH— (benzamide structure).

When the phosphonic acid group is bonded to the surface of a pigment particle through the other atomic group, the functional group more preferably contains a structure of "—CQ($PO_3[M_1]_2$)$_2$." Here, Q in the formula represents R, OR, SR, or $NR_2$ (where R's each independently represent a hydrogen atom, an alkyl group, an acyl group, an aralkyl group, or an aryl group). When R represents a group containing a carbon atom, the number of carbon atoms is preferably 1 to 18. Specific examples of the group containing a carbon atom can include alkyl groups such as a methyl group and an ethyl group; acyl groups such as an acetyl group and a benzoyl group; aralkyl groups such as a benzyl group; and aryl groups such as a phenyl group and a naphthyl group. In addition, $M_1$'s in the formula each independently represent at least one kind selected from the group consisting of a hydrogen atom, an alkali metal, ammonium, and an organic ammonium. The functional group particularly preferably contains the structure "—CH($PO_3[M_1]_2$)$_2$" where Q in the formula represents a hydrogen atom among others. In the present invention, the functional group is particularly preferably of the structure "—$C_6H_4$—CONH—CH—($PO_3[M_1]_2)_2$."

Average Particle Size

Each of the average particle sizes of the first pigment and the second pigment is preferably 50 nm or more and 200 nm or less. When the average particle size is less than 50 nm, the image quality and the image durability may somewhat reduce. When the average particle size exceeds 200 nm, the storage stability of the ink may somewhat reduce. In addition, the average particle size of the first pigment is preferably 90 nm or less, more preferably 85 nm or less, and the average particle size of the second pigment is preferably 110 nm or more, more preferably 120 nm or more because the effect of the present invention can be obtained at an additionally high level.

It should be noted that the term "average particle size" as used in the present invention refers to the average particle size on volume basis (D50) of a self-dispersible carbon black in a state of being dispersed in the ink and means the cumulative 50% particle size of its particle size distribution (median size). In Examples to be described later, the average particle size was measured with a particle size analyzer as a measuring apparatus utilizing a dynamic light scattering method (available under the trade name "Nanotrac UPA150EX" from NIKKISO CO., LTD.).

Introduced Amount of Functional Group

A bisphosphonic acid type self-dispersible pigment reacts with calcium, which is contained as a loading material or the like in a recording medium, in an extremely strong manner. Accordingly, the introduced amount of a functional group bonded to the surface of a carbon black particle is preferably lower in order that the pigment can be quickly agglomerated in the recording medium and the optical density of an image can be obtained at a high level. However, a major feature of the ink of the present invention is that two kinds of carbon blacks having different average particle sizes are incorporated and are made to differ from each other in introduced amount of a functional group. That is, the second pigment having a relatively large average particle size is made to have a relatively low introduced amount of the functional group. In contrast, the first pigment having a relatively small average particle size is made to have a relatively high introduced amount of the functional group.

The introduced amount of the functional group of the first pigment is preferably 0.23 mmol/g or more, more preferably 0.30 mmol/g or more. The introduced amount of the functional group of the second pigment is preferably 0.18 mmol/g or less, more preferably 0.15 mmol/g or less. Setting the introduced amounts of the functional groups within the ranges can additionally improve the image quality and the image durability, and the storage stability of the ink. It should be noted that the unit of the introduced amount of the functional group is the number of millimoles of the functional group per 1 g of carbon black solid matter.

The introduced amount of a functional group bonded to the surface of a carbon black particle can be measured by determining the quantity of phosphorus as described below. Specifically, first, a liquid A is prepared by diluting a pigment dispersion liquid with pure water so that the content of a pigment (solid matter) become about 0.03 mass %. In addition, the pigment dispersion liquid is subjected to ultracentrifugation under the conditions of 5° C., 80,000 rpm, and 15 hours, a supernatant liquid from which the pigment has been removed is collected, and the liquid is diluted with pure water by a factor of about 80 to prepare a liquid B. Phosphorus is quantitatively determined for each of the liquid A and liquid B thus prepared with an ICP emission spectrophotometer or the like, and the amount of a phosphonic acid group can be calculated from a difference in phosphorus amount determined from the values measured for the liquid A and the liquid B. In addition, the introduced amount of the functional group can be calculated from the equation "amount of phosphonic acid group/n" (where n represents the number of phosphonic acid groups in one functional group, and represents 1 in the case of a monophosphonic acid group, 2 in the case of a bisphosphonic acid group, or 3 in the case of a trisphosphonic acid group). Here, the number of phosphonic acid groups in the functional group can be found by analyzing the structure of the functional group according to an analysis method such as NMR. Although a method of measuring the introduced amount of the functional group with the pigment dispersion liquid has been described above, the measurement can be similarly performed with an ink. It should be appreciated that the method of measuring the introduced amount of the functional group is not limited to the foregoing.

DBP Oil Absorption

Each of the DBP oil absorptions (unit: mL/100 g of pigment) of the first pigment and the second pigment is preferably 50 mL/100 g or more and 200 mL/100 g or less. Further, a relationship regarding the DBP oil absorption is preferably set as described below because the effect of the present invention can be more efficiently obtained. That is, the DBP oil absorption of the second pigment is preferably set to be larger than that of the first pigment. Further, it is preferred that the DBP oil absorption of the first pigment be set to less than 110 mL/100 g and the DBP oil absorption of the second pigment be set to 110 mL/100 g or more. In addition, the difference in DBP oil absorption between the first pigment and the second pigment is particularly preferably set to 10 mL/100 g or more. The DBP oil absorption of a pigment can be measured by a method in conformity with JIS K 6221 or ASTM D 2414. The above-mentioned method is a method involving dropping dibutyl phthalate to 100 g of the pigment under stirring; and measuring the addition amount of dibutyl phthalate at the time point when torque becomes maximum.

BET Specific Surface Area

The specific surface area of a pigment by a BET method is preferably 100 $m^2$/g or more and 600 $m^2$/g or less. The specific surface area by the BET method can be measured by a method in conformity with, for example, JIS K 6217 or ASTM D 6556. The above-mentioned method is a method involving immersing a deaerated pigment in liquid nitrogen and measuring the amount of nitrogen adsorbing to the surface of a particle of the pigment when equilibrium is reached.

Verification Method

Whether an ink satisfies the requirements specified in the present invention can be verified by, for example, such a method as described below.

Method of Verifying Whether Two Kinds of Pigments Having Different Average Particle Sizes are Present in Ink Verification as to whether two kinds of pigments having different average particle sizes are present in an ink is performed by measuring the particle size distribution of the ink with a columnar particle size distribution measuring apparatus (such as an apparatus available under the trade name "CHDF-2000" from Matec Applied Sciences Co.). The columnar particle size distribution measuring apparatus can measure a detailed particle size distribution. Therefore, when only one kind of pigment is present in the ink, only one substantial local maximum value is detected, and when two kinds of pigments are present, two local maximum values are detected.

Method of Verifying Introduced Amount of Functional Group from Ink in which Two Kinds of Pigments are Present When it can be confirmed that two kinds of pigments are present in the ink as described above, the introduced amount of a functional group can be verified for each of the two kinds of pigments from the ink by the following procedure. First, the introduced amount of the functional group of the whole pigments present in the ink is calculated through the quantitative determination of phosphorus with the ICP emission spectrophotometer or the like. In addition, the average particle size of the whole pigments present in the ink is measured with the particle size analyzer or the like. Aside from the foregoing, the ink is subjected to an ultracentrifugation treatment (at 10,000 rpm for 1 hour), and 20% (on volume basis) of a liquid is collected from each of its upper portion and lower portion. The average particle size and introduced amount of the functional group of the pigment are determined for the liquid of the upper portion and the liquid of the lower portion thus collected by the same methods as those described above. It should be noted that an influence of the average particle size is appropriately considered upon calculation of the introduced amount of the functional group. In addition, when the average particle size and introduced amount of the functional group in the liquid of the upper portion are respectively higher than the average particle size and introduced amount of the functional group of the whole pigments present in the ink determined in advance, the introduced amount of the functional group in the pigment having a relatively small average particle size is high. In contrast, when the average particle size and introduced amount of the functional group in the liquid of the lower portion are respectively lower than the average particle size and introduced amount of the functional group of the entire pigments present in the ink determined in advance, the introduced amount of the functional group in the pigment having a relatively large average particle size is low.

Aqueous Medium

An aqueous medium which is a mixed solvent of water and a water-soluble organic solvent can be incorporated into the ink of the present invention. Deionized water is preferably used as water. The water content (mass %) in the ink is preferably 50.00 mass % or more and 95.00 mass % or less with reference to the total mass of the ink. In addition, the content (mass %) of the water-soluble organic solvent in the ink is preferably 3.00 mass % or more and 50.00 mass % or less with reference to the total mass of the ink. Any one of the solvents that can be used in an ink for ink jet such as alcohols, glycols, glycol ethers, and nitrogen-containing compounds can be used as the water-soluble organic solvent, and one or more kinds of the solvents can be incorporated into the ink.

Salt Formed by Bonding of Monovalent Cation and Anion

A salt formed by the bonding of a monovalent cation and an anion may be incorporated into the ink of the present invention. The use of the salt can further increase the optical density of the image. The content (mass %) of the salt in the ink is preferably 0.01 mass % or more and 10.00 mass % or less, more preferably 0.05 mass % or more and 2.00 mass % or less with reference to the total mass of the ink, though the preferred value varies depending on the molecular weight of the salt. When the content of the salt is less than 0.01 mass %, the improving effect on the optical density of the image may not be obtained. When the content of the salt exceeds 10.00 mass %, the storage stability of the ink may somewhat reduce.

Examples of the monovalent cation include an alkali metal ion, an ammonium ion, and an organic ammonium ion. Examples of the alkali metal ion include ions of lithium, sodium, and potassium. In addition, an example of the organic ammonium ion is an ion obtained by substituting at least one hydrogen atom of an ammonium ion with an organic group. In addition, examples of the anion include $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$. The form of the salt in the ink may be any of a form in which part thereof is dissociated or a form in which all thereof is dissociated.

Examples of the salt formed by the bonding of a monovalent cation and an anion include $(M_2)Cl$, $(M_2)Br$, $(M_2)I$, $(M_2)ClO$, $(M_2)ClO_2$, $(M_2)ClO_3$, $(M_2)ClO_4$, $(M_2)NO_2$, $(M_2)NO_3$, $(M_2)_2SO_4$, $(M_2)_2CO_3$, $(M_2)HCO_3$, $HCOO(M_2)$, $(COOM_2)_2$, $COOH(COOM_2)$, $CH_3COOM_2$, $C_2H_4(COOM_2)_2$, $C_6H_5COOM_2$, $C_6H_4(COOM_2)_2$, $(M_2)_3PO_4$, $(M_2)_2HPO_4$, and $(M_2)H_2PO_4$. It should be noted that $M_2$ represents at least one kind selected from the group consisting of an alkali metal ion, an ammonium ion, and an organic ammonium ion.

The salt is preferably at least one kind selected from the group consisting of $C_6H_4(COONa)_2$, $C_6H_4(COOK)_2$, $C_6H_4(COONH_4)_2$, and $(NH_4)_2SO_4$. In addition, the salt is more preferably at least one kind selected from the group consisting of $C_6H_4(COOK)_2$, $C_6H_4(COONH_4)_2$, and $(NH_4)_2SO_4$.

Other Additives

A water-soluble organic compound that is a solid at normal temperature such as urea or a derivative thereof, trimethylolpropane, or trimethylolethane may be incorporated into the ink of the present invention in addition to the foregoing components. The content (mass %) of the water-soluble organic compound that is a solid at normal temperature in the ink is preferably 0.10 mass % or more and 20.00 mass % or less, more preferably 3.00 mass % or more and 10.00 mass % or less with reference to the total mass of the ink. In addition, various additives such as a surfactant, a resin, a pH adjustor, a defoaming agent, a rust inhibitor, an antiseptic, a mildewproofing agent, an antioxidant, an anti-reducing agent, and a chelating agent may be incorporated as required.

In the present invention, a surfactant such as an acetylene glycol type, fluorine type, silicone type, or polyoxyethylene alkyl ether type surfactant is preferably incorporated into the ink. The content (mass %) of the surfactant in the ink is preferably 0.05 mass % or more and 2.00 mass % or less with reference to the total mass of the ink.

Physical Properties of Ink

In the present invention, the viscosity of the ink at 25° C. is preferably 1.0 mPa·s or more and 5.0 mPa·s or less, more preferably 1.0 mPa·s or more and 3.0 mPa·s or less. In addition, the static surface tension of the ink at 25° C. is preferably 28 mN/m or more and 45 mN/m or less. In addition, the pH of the ink at 25° C. is preferably 5 or more and 9 or less.

Ink Cartridge

An ink cartridge of the present invention includes an ink and an ink storage portion for storing the ink. In addition, the ink stored in the ink storage portion is the ink of the present invention described above. The structure of the ink cartridge is, for example, as follows: the ink storage portion is constituted of a negative-pressure-generating member storage portion for storing a negative-pressure-generating member for holding the ink in a state of being impregnated with the ink by a negative pressure and an ink storage chamber for storing the ink in a state of not being impregnated with the ink by the negative-pressure-generating member. Alternatively, the ink storage portion may be of any one of the following constructions: the ink storage portion does not have such an ink storage chamber as described above and holds the total amount of the ink in a state of being impregnated with the ink by the negative-pressure-generating member, or the ink storage portion does not have the negative-pressure-generating member and stores the total amount of the ink in a state of not being impregnated with the ink by the negative-pressuregenerating member. Further, the ink cartridge may be of such a form that the ink cartridge is configured to have the ink storage portion and a recording head.

Ink Jet Recording Method

An ink jet recording method of the present invention is a method involving ejecting the ink of the present invention described above from a recording head of an ink jet system to record an image on a recording medium. The system for the ejection of the ink is, for example, a system involving applying mechanical energy to the ink or a system involving applying thermal energy to the ink. In the present invention, an ink jet recording method involving utilizing thermal energy is particularly preferably adopted. The process of the ink jet recording method may be a known one except that the ink of the present invention is used.

In consideration of the above-mentioned mechanism, the ink of the present invention described above is more preferably used for the recording of an image on a recording medium containing calcium. Examples of such recording medium include glossy paper and plain paper. Of those, plain paper is particularly preferably used. It should be appreciated that the recording medium that can be used in the ink jet recording method of the present invention is not limited thereto.

Hereinafter, the present invention is described in more detail by way of Examples and Comparative Examples. However, the present invention is not limited by Examples below unless going beyond the gist thereof. It should be noted that the terms "part(s)" and "%" in the following description refer to "part(s) by mass" and "mass %," respectively unless otherwise stated.

Preparation of Pigment Dispersion Liquid

Introduced amount of functional group of pigment First, a method of measuring the introduced amount of a functional group of a pigment is described. A liquid A was prepared by diluting a pigment dispersion liquid with pure water so that the content of the pigment as a measuring object became about 0.03%. In addition, the pigment dispersion liquid was subjected to ultracentrifugation under the conditions of 5° C., 80,000 rpm, and 15 hours, a supernatant liquid from which a bisphosphonic acid type self-dispersible pigment had been removed was collected, and the liquid was diluted with pure water by a factor of about 80 to prepare a liquid B. Phosphorus was quantitatively determined for the liquid A and liquid B as samples for measurement prepared as described above with an ICP emission spectrophotometer (available under the trade name "SPS5100" from Hitachi High-Tech Science Corporation). Then, the amount of a phosphonic acid group was determined from a difference in phosphorus amount between the prepared liquid A and liquid B, and the introduced amount of the functional group of the pigment was calculated by dividing the determined amount by the number of phosphonic acid groups in one functional group.

Average Particle Size of Pigment

The average particle size of a pigment was determined as described below. The cumulative 50% particle size (D50) of its particle size distribution on volume basis was measured with a particle size analyzer as a measuring apparatus utilizing a dynamic light scattering method (available under the trade name "Nanotrac UPA150EX" from NIKKISO CO., LTD.), and the measured value was defined as the average particle size.

Pigment Dispersion Liquid 1

20 grams (solid matter) of a carbon black, 4.3 mmol of monosodium ((4-aminobenzoylamino)-methane-1,1-diyl) bisphophonate (treatment agent), 20 mmol of nitric acid, and 200 mL of pure water were mixed. At this time, a carbon black (trade name: "BLACK PEARLS 880," manufactured by Cabot Corporation, DBP oil absorption: 105 mL/100 g, specific surface area: 220 m$^2$/g) was used to conduct mixing with a Silverson mixer at room temperature and a number of revolutions of 4,000 rpm to obtain a mixture. 30 minutes after that, 20 mmol of sodium nitrite dissolved in a small amount of water was slowly added to the resultant mixture to conduct mixing. The temperature of the mixture reached 60° C. as a result of the mixing, and the mixture was subjected to a reaction in this state for 1 hour. After that, the pH of the mixture was adjusted to 10 with an aqueous solution of sodium hydroxide. 30 minutes after that, 20 mL of pure water was added to the mixture and the whole was subjected to diafiltration with a spectrum membrane, followed by the adjustment of the content of the pigment to 10.0% to provide a dispersion liquid. Thus, a pigment dispersion liquid 1 in a state where a self-dispersible carbon black in which a —C$_6$H$_4$—CONH—CH—(PO(OH)(ONa))(PO(OH)$_2$) group was bonded to a pigment particle surface was dispersed in water was obtained. The liquid had an introduced amount of a functional group of 0.21 mmol/g and an average particle size of 95 nm.

Pigment Dispersion Liquid 2

A dispersion liquid having a pigment content of 10.0% was obtained by the same procedure as that of the pigment dispersion liquid 1 except that the amount of the treatment agent was changed to 3.5 mmol; the BLACK PEARLS 880 was changed to a product available under the trade name "BLACK PEARLS 700" (manufactured by Cabot Corporation, DBP oil absorption: 118 mL/100 g, specific surface area: 246 m$^2$/g); and the number of revolutions at the time of the mixing was changed to 6,000 rpm. Thus, a pigment dispersion liquid 2 in a state where a self-dispersible carbon black in which a —C$_6$H$_4$—CONH—CH—(PO(OH)(ONa))(PO(OH)$_2$) group was bonded to a pigment particle surface was dispersed in water was obtained. The liquid had an introduced amount of a functional group of 0.19 mmol/g and an average particle size of 110 nm.

Pigment dispersion liquids 3 to 10 Dispersion liquids having a pigment content of 10.0% were obtained by the same procedure as that of the pigment dispersion liquid 1 except that the amount of the treatment agent, the kind of the carbon black, and the number of revolutions at the time of the mixing were changed as shown in Table 1. Thus, pigment dispersion liquids 3 to 10 in a state where a self-dispersible carbon black in which a —C$_6$H$_4$—CONH—CH—(PO(OH)(ONa))(PO(OH)$_2$) group was bonded to a pigment particle surface was dispersed in water were obtained. Table 1 shows the introduced amounts of functional groups and average particle sizes of the liquids.

TABLE 1

Preparation conditions and characteristics of pigment dispersion liquids 3 to 10

| | Preparation condition | | | Characteristic | |
|---|---|---|---|---|---|
| | Amount of treatment agent (mmol) | Kind of carbon black | Number of revolutions at the time of mixing (rpm) | Introduced amount of functional group (mmol/g) | Average particle size (nm) |
| Pigment dispersion liquid 3 | 7.8 | BLACK PEARLS 880 | 4,000 | 0.30 | 95 |
| Pigment dispersion | 2.0 | BLACK PEARLS | 6,000 | 0.15 | 110 |

TABLE 1-continued

Preparation conditions and characteristics of pigment dispersion liquids 3 to 10

| | Preparation condition | | | Characteristic | |
|---|---|---|---|---|---|
| | Amount of treatment agent (mmol) | Kind of carbon black | Number of revolutions at the time of mixing (rpm) | Introduced amount of functional group (mmol/g) | Average particle size (nm) |
| Pigment dispersion liquid 4 | | | 700 | | |
| Pigment dispersion liquid 5 | 7.8 | BLACK PEARLS 880 | 6,000 | 0.30 | 85 |
| Pigment dispersion liquid 6 | 2.0 | BLACK PEARLS 700 | 4,000 | 0.15 | 120 |
| Pigment dispersion liquid 7 | 4.3 | BLACK PEARLS 700 | 6,000 | 0.21 | 110 |
| Pigment dispersion liquid 8 | 3.5 | BLACK PEARLS 880 | 4,000 | 0.19 | 95 |
| Pigment dispersion liquid 9 | 2.0 | BLACK PEARLS 880 | 6,000 | 0.15 | 85 |
| Pigment dispersion liquid 10 | 7.8 | BLACK PEARLS 700 | 4,000 | 0.30 | 120 |

Pigment Dispersion Liquid 11

A dispersion liquid having a pigment content of 10.0% was obtained by the same procedure as that of the pigment dispersion liquid 1 except that the treatment agent was changed to 2.0 mmol of sodium (4-(4-aminobenzenesulfonylamino)-1-hydroxybutane-1,1-diyl)bisphosphonate; the BLACK PEARLS 880 was changed to a product available under the trade name "BLACK PEARLS 700" (manufactured by Cabot Corporation, DBP oil absorption: 118 mL/100 g, specific surface area: 246 m$^2$/g); and the number of revolutions at the time of the mixing was changed to 6,000 rpm. Thus, a pigment dispersion liquid 11 in a state where a self-dispersible carbon black in which a —$C_6H_4$—$SO_2$—NH—$C_4H_7$(OH)(PO(OH)(ONa))(PO(OH)$_2$) group was bonded to a pigment particle surface was dispersed in water was obtained. The liquid had an introduced amount of a functional group of 0.15 mmol/g and an average particle size of 122 nm.

Pigment Dispersion Liquid 12

1.1 grams of 4-amino-1,2-benzenedicarboxylic acid (treatment agent, manufactured by Tokyo Chemical Industry Co., Ltd.) in a state of being cooled to 5° C. was added to a hydrochloric acid solution obtained by dissolving 5 g of concentrated hydrochloric acid in 5.5 g of water. Next, a container containing the solution was placed in an ice bath and the solution was brought into a state of being constantly kept at 10° C. or less by stirring the solution, followed by the addition of a potassium nitrite solution, which was obtained by dissolving 1.8 g of potassium nitrite in 9 g of water at 5° C., to the solution. The mixture was further stirred for 15 minutes and then 6 g (solid matter) of a carbon black (trade name: "BLACK PEARLS 880," manufactured by Cabot Corporation) was added to the mixture under stirring. After that, the mixture was further stirred for 15 minutes to provide slurry. The resultant slurry was subjected to diafiltration with a spectrum membrane, and then particles were sufficiently washed with water and dried in an oven at 110° C. Further, pure water was added to disperse the particles so that the content of the pigment became 10.0%, thereby providing a dispersion liquid. Thus, a pigment dispersion liquid 12 in a state where a self-dispersible carbon black in which a —$C_6H_4$—(COOK)$_2$ group was bonded to a particle surface was dispersed in water was obtained. The liquid had an introduced amount of a functional group of 0.30 mmol/g and an average particle size of 85 nm. It should be noted that the introduced amount of the functional group is a value determined by measuring a potassium ion concentration in the pigment dispersion liquid with an ICP emission spectrophotometer (available under the trade name "SPS5100" from Hitachi High-Tech Science Corporation) and converting the resultant potassium ion concentration.

Pigment Dispersion Liquid 13

A dispersion liquid having a pigment content of 10.0% was obtained by the same procedure as that of the pigment dispersion liquid 12 except that: the amount of the treatment agent was changed to 0.56 g; and the BLACK PEARLS 880 was changed to a product available under the trade name "BLACK PEARLS 700" (manufactured by Cabot Corporation). Thus, a pigment dispersion liquid 13 in a state where a self-dispersible carbon black in which a —$C_6H_4$—(COOK)$_2$ group was bonded to a particle surface was dispersed in water was obtained. The liquid had an introduced amount of a functional group of 0.15 mmol/g and an average particle size of 120 nm.

Preparation of Ink

Respective components (unit: %) shown in the upper rows of Table 2 were mixed and sufficiently stirred, and then the mixture was filtered with a polypropylene filter having a pore size of 2.5 μm (manufactured by Pall Corporation) under pressure to prepare each ink. It should be noted that an Acetylenol E100 in Table 2 is an ethylene oxide adduct of acetylene glycol manufactured by Kawaken Fine Chemicals Co., Ltd., and is a surfactant having a number of moles of added ethylene oxide group of 10. The lower rows of Table 2 show values for content A (%) of a first pigment in the ink, content B (%) of a second pigment therein, and the mass ratio (times) of A to B.

TABLE 2

Composition of ink

| | Example | | | | | | | | Comparative Example | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Pigment dispersion liquid 1 | 10.00 | | | | | | | | | | 10.00 | 10.00 | | |
| Pigment dispersion liquid 2 | 20.00 | | | | | | | | | | | | | |
| Pigment dispersion liquid 3 | | 10.00 | | | | | | | | | | | | |
| Pigment dispersion liquid 4 | | 20.00 | | | | | | | | | | | | |
| Pigment dispersion liquid 5 | | | 10.00 | | 1.00 | 9.00 | 3.00 | 1.50 | 10.00 | | | | | |
| Pigment dispersion liquid 6 | | | 20.00 | 29.00 | 21.00 | 27.00 | 28.50 | | | | | | | |
| Pigment dispersion liquid 7 | | | | | | | | | | | 30.00 | | 20.00 | |

TABLE 2-continued

Composition of ink

| | Example | | | | | | | | Comparative Example | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Pigment dispersion liquid 8 | | | | | | | | | | | | 20.00 | | |
| Pigment dispersion liquid 9 | | | | | | | | | | | | | 10.00 | |
| Pigment dispersion liquid 10 | | | | | | | | | | | | | 20.00 | |
| Pigment dispersion liquid 11 | | | | | | | | 20.00 | | 30.00 | | | | |
| Pigment dispersion liquid 12 | | | | | | | | | | | | | | 10.00 |
| Pigment dispersion liquid 13 | | | | | | | | | | | | | | 20.00 |
| Glycerin | 5.00 | 5.00 | 5.00 | 5.00 | 5.00 | 5.00 | 5.00 | 5.00 | 5.00 | 5.00 | 5.00 | 5.00 | 5.00 | 5.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 | 5.00 | 5.00 | 5.00 | 5.00 | 5.00 |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 | 0.15 |
| Pure water | 49.85 | 49.85 | 49.85 | 49.85 | 49.85 | 49.85 | 49.85 | 49.85 | 49.85 | 49.85 | 49.85 | 49.85 | 49.85 | 49.85 |
| Content A (%) of first pigment | 1.00 | 1.00 | 1.00 | 0.10 | 0.90 | 0.30 | 0.15 | 1.00 | 3.00 | 3.00 | 1.00 | 1.00 | 1.00 | 1.00 |
| Content B (%) of second pigment | 2.00 | 2.00 | 2.00 | 2.90 | 2.10 | 2.70 | 2.85 | 2.00 | — | — | 2.00 | 2.00 | 2.00 | 2.00 |
| Mass ratio (times) of A to B | 0.50 | 0.50 | 0.50 | 0.03 | 0.43 | 0.11 | 0.05 | 0.50 | — | — | 0.50 | 0.50 | 0.50 | 0.50 |

Evaluation

The following evaluations were performed by using the inks prepared in the foregoing. In the present invention, with regard to evaluation criteria for image quality, image durability, and storage stability, AAA, AA, and A were defined as acceptable levels, and B and C were defined as unacceptable levels. Table 3 shows the results.

Image Quality

An ink cartridge filled with each ink prepared in the foregoing was set in an ink jet recording apparatus on which a recording head for ejecting ink by means of thermal energy (trade name: "PIXUS MP480," manufactured by Canon Inc.) had been mounted. The ink jet recording apparatus has a resolution of 600 dpi×600 dpi, and the condition under which one ink droplet having a mass per droplet of 25 ng±10% is applied to a unit region measuring 1/600 inch by 1/600 inch is defined as a recording duty of 100%. Then, a solid image (2 cm×2 cm/1 line) having a recording duty of 100% was recorded on two kinds of recording media to provide recorded articles. The following recording media were used as the recording media: (1) a recording medium available under the trade name "GF-500" (manufactured by Canon Inc.) and (2) a recording medium available under the trade name "HP Bright White" (manufactured by Hewlett-Packard Company). The optical densities of the solid images in the resultant two kinds of recorded articles were measured with a reflection densitometer (trade name: "Macbeth RD-918," manufactured by Macbeth) 1 day after the recording of the solid images. In addition, the uniformity of the solid images was visually observed. An evaluation for image quality was performed based on the optical densities and uniformity of the solid images according to the following criteria.

AAA: Each of the optical densities of the solid images in the two kinds of recorded articles was 1.55 or more, and the uniformity of each of the solid images in the two kinds of recorded articles was good.

AA: Each of the optical densities of the solid images in the two kinds of recorded articles was 1.55 or more, and the uniformity of the solid image in the recorded article using the medium (2) was good, but the uniformity of the solid image in the recorded article using the medium (1) was somewhat poor.

A: Each of the optical densities of the solid images in the two kinds of recorded articles was 1.55 or more, and the uniformity of each of the solid images in the two kinds of recorded articles was somewhat poor.

B: Each of the optical densities of the solid images in the two kinds of recorded articles was 1.55 or more, and a site where the uniformity of the solid image in each recorded article was poor was conspicuous.

C: Each of the optical densities of the solid images in the two kinds of recorded articles was less than 1.55.

Image Durability

A solid image was recorded under the same conditions as those of the evaluation for image quality except that photographic paper (trade name: "Canon Photographic Paper-Gloss Pro [Platinum Grade]," manufactured by Canon Inc.) was used as a recording medium, thereby providing a recorded article. Silbon paper and a weight having a contact pressure of 40 g/cm$^2$ were placed on the resultant recorded article 10 minutes after the recording of the solid image, and the recorded article and the silbon paper were rubbed with each other. After that, the silbon paper and the weight were removed, and the scratch resistance of the solid image was visually observed. An evaluation for image durability was performed based on the scratch resistance of the solid image according to the following criteria.

AA: Most of the solid image remained on the recorded article.

A: About half of the solid image remained on the recorded article.

B: The solid image slightly remained on the recorded article.

C: Nearly none of the solid image remained on the recorded article.

Comprehensive Evaluation of Image

The total performance of an image was relatively evaluated with 5 points to 0 points based on the results of the evaluations for image quality and image durability. A higher point means that both of the image quality and the image durability are achieved in a balanced manner, and both are at high levels.

Storage Stability

Each ink prepared in the foregoing was charged into an airtight container and stored in a thermostatic bath at a temperature of 80° C. for 2 weeks. After that, the ink was visually observed. The ink was evaluated for its storage stability according to the following criteria.

AA: No deposit or the like occurred, and there was no change between the states of the ink before and after the storage.

A: A deposit or the like slightly occurred, but there was no clear change between the states of the ink before and after the storage.

B: A deposit or the like considerably occurred, and there was a change between the states of the ink before and after the storage.

C: A deposit or the like remarkably occurred, and there was a clear change between the states of the ink before and after the storage.

TABLE 3

Results of evaluations

|  |  | Image quality | Image durability | Comprehensive evaluation of image | Storage stability |
|---|---|---|---|---|---|
| Example | 1 | A | A | 2 | A |
|  | 2 | A | A | 2 | AA |
|  | 3 | A | AA | 3 | AA |
|  | 4 | AAA | AA | 5 | A |
|  | 5 | AA | AA | 4 | AA |
|  | 6 | AAA | AA | 5 | A |
|  | 7 | AAA | AA | 5 | A |
|  | 8 | A | AA | 3 | A |
| Comparative Example | 1 | A | C | 1 | B |
|  | 2 | A | C | 1 | C |
|  | 3 | A | B | 1 | A |
|  | 4 | A | B | 1 | A |
|  | 5 | B | B | 0 | AA |
|  | 6 | C | B | 0 | AA |

It should be noted that as can be seen from comparison between the storage stability of Example 4 and that of Example 7, the storage stability of Example 7 was relatively good.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133468, filed Jun. 26, 2013, which is hereby incorporated by reference herein in its entirety.

What is claimed is:

1. An ink for ink jet, comprising:
a first pigment; and
a second pigment,
wherein:
each of the first pigment and the second pigment comprises a self-dispersible carbon black in which a functional group containing two phosphonic acid groups is bonded to a particle surface;
an average particle size of the first pigment is smaller than an average particle size of the second pigment; and
an introduced amount of the functional group of the first pigment is higher than an introduced amount of the functional group of the second pigment.

2. An ink according to claim 1, wherein the introduced amount of the functional group of the first pigment is 0.23 mmol/g or more and the introduced amount of the functional group of the second pigment is 0.18 mmol/g or less.

3. An ink according to claim 1, wherein the average particle size of the first pigment is 90 nm or less and the average particle size of the second pigment is 120 nm or more.

4. An ink according to claim 1, wherein a mass ratio of a content (mass %) of the first pigment to a content (mass %) of the second pigment is 0.05 times or more and 0.45 times or less.

5. An ink cartridge, comprising:
an ink; and
an ink storage portion for storing the ink,
wherein the ink comprises the ink according to claim 1.

6. An ink jet recording method, comprising ejecting an ink from a recording head of an ink jet system to record an image on a recording medium, wherein the ink comprises the ink according to claim 1.

* * * * *